, McGeady and Stanger

United States Patent [19]

Bloch

[11] 3,945,126
[45] Mar. 23, 1976

[54] GEAR TESTER

[75] Inventor: Peter Bloch, Mutschellen, Switzerland

[73] Assignee: Maag Gear-Wheel & Machine Company Limited, Zurich, Switzerland

[22] Filed: Sept. 13, 1974

[21] Appl. No.: 505,909

[52] U.S. Cl. .......................................... 33/179.5 R
[51] Int. Cl.² .......................................... G01B 9/02
[58] Field of Search ............... 33/179.5 R, 175.5 D

[56] References Cited
UNITED STATES PATENTS

| | | | |
|---|---|---|---|
| 2,913,831 | 11/1959 | Höfler | 33/179.5 R |
| 3,233,331 | 2/1966 | Bassoff | 33/179.5 D |
| 3,366,934 | 1/1968 | Kelsey | 33/174 P |
| 3,481,042 | 12/1969 | Lemelson | 33/174 P |
| 3,741,659 | 6/1973 | Jones | 33/179.5 R |
| 3,750,295 | 8/1973 | Nordmann | 33/174 P |

FOREIGN PATENTS OR APPLICATIONS

| | | |
|---|---|---|
| 2,064,277 | 7/1972 | Germany |
| 1,065,999 | 4/1967 | United Kingdom |
| 818,163 | 8/1959 | United Kingdom |

Primary Examiner—Richard E. Aegerter
Assistant Examiner—Willis Little
Attorney, Agent, or Firm—Toren, McGeady and Stanger

[57] ABSTRACT

A gear tooth profile testing apparatus has a pair of displaceable measuring devices, one of which is movably mounted on an adjustable base plate and has the other device movably mounted on it. A probe mounted on said other device has biasing means urging it against the profile under test. Drive means displace one of the devices, which transmits signals of relative movements between the two devices to a computer. The computer receives from the other device signals of its movements relative to the base plate. The computer compares these measurements of probe movement with reference values to evaluate deviations in the measured profile.

7 Claims, 5 Drawing Figures

GEAR TESTER

BACKGROUND OF THE INVENTION

The invention relates to apparatus for testing gearing profiles by means of comparison of measurements of the profiles of the gearing teeth with reference values for such measurements.

In one known gearwheel tester, the gearwheel to be tested is secured to a base circle disc, which rolls on a fixed generating straight edge. A probe or stylus is arranged on a fixed support and has a contact point with the gear at the starting point of the involute tooth profile on the base circle that agrees with the point of contact between base circle disc and generating straight edge. The probe deflects with deviation of the tooth profile from the involute during the rolling of the testing wheel and as a result indicates the difference between tooth profile and theoretical involute. However, such appliances are only suitable for testing gearwheels of limited diameter, perhaps up to one meter or slightly more, since firstly the base circle disc can only be made up to a limited diameter for technical manufacturing and precision reasons, and secondly the weight of the wheel being tested and rolling on the generating straight edge cannot be unlimited. These restrictions also exist with appliances of which the base circle is adjustable with lever transmissions and auxiliary slides.

For the testing of the profiles of larger gearwheels, appliances are also known in which a base circle segment is fixed on a stationary test wheel or gear and the involute profile is then tested with a probe or stylus, the support of which rolls with a generating straight edge on a base circle segment. Such base circle segments are however costly and can only be used for a quite specific base circle size, are not capable of being easily centred relatively to the axis of the gearwheel to be tested, and moreover the rolling of the appliance is not capable of being easily controlled, because of its size, so that also here the diameters of the gears that can be tested are also restricted in practice.

Another testing apparatus has been proposed in which the rotation of the gear to be tested is established by means of an angle detector and the associated linear movement of the stylus is measured with a straight edge or linear detector. The pulses of the angle detector and of the linear detector are fed to a digital computer, which compares the measured values with the theoretical involutes and records the calculated deviations by a digital or analog procedure. The necessary rotation of the test wheel or gear, however, also in this case sets limitations as regards diameter and weight (Japanese Specification as laid open No. 18 790/1972).

SUMMARY OF THE INVENTION

The invention has for its object to provide the possibility of testing the profiles of gearwheels substantially without restriction as to size and weight, and which may be employed while the gearwheel is still clamped on a gear production machine.

This object is achieved with an apparatus of the form in which two measuring devices are provided for measuring two components of a relative movement between the tooth profile to be tested and a probe or stylus which is movable along the profile, the measurement values of said devices being fed to a computer, advantageously in digital form, which compares them with values introduced by a programme according to the progress of the relative movement, and establishes the differences between the reference values and the actual values. In accordance with the invention the probe or stylus is arranged on one of two measuring devices, said device being mounted on the second measuring device which is movable in relation to a base plate, the two devices being movable in different directions, one of said two devices having drive means associated with it, the probe or stylus being held against the tooth flank under test by an arrangement, which either biases the two devices relatively to one another or biases that device which is not driven directy relatively to the base plate, one of the two measuring devices being arranged to provide signals of the relative movements of the devices in relation to one another arising in the operation of the device drive means with the gear stationary, and the second measuring device is arranged to provide signals of the relative movements of said device in relation to the base plate which is stationary during the testing operation.

Using such an apparatus, not only is it possible to test involute profiles, but also other profiles which can be expressed in mathematical form.

BRIEF DESCRIPTION OF THE DRAWINGS

The invention is hereinafter further explained by reference to the accompanying diagrammatic drawings which show four constructional examples, in each case with an associated block circuit diagram.

DESCRIPTION OF THE PREFERRED EMBODIMENTS

Figure 1:
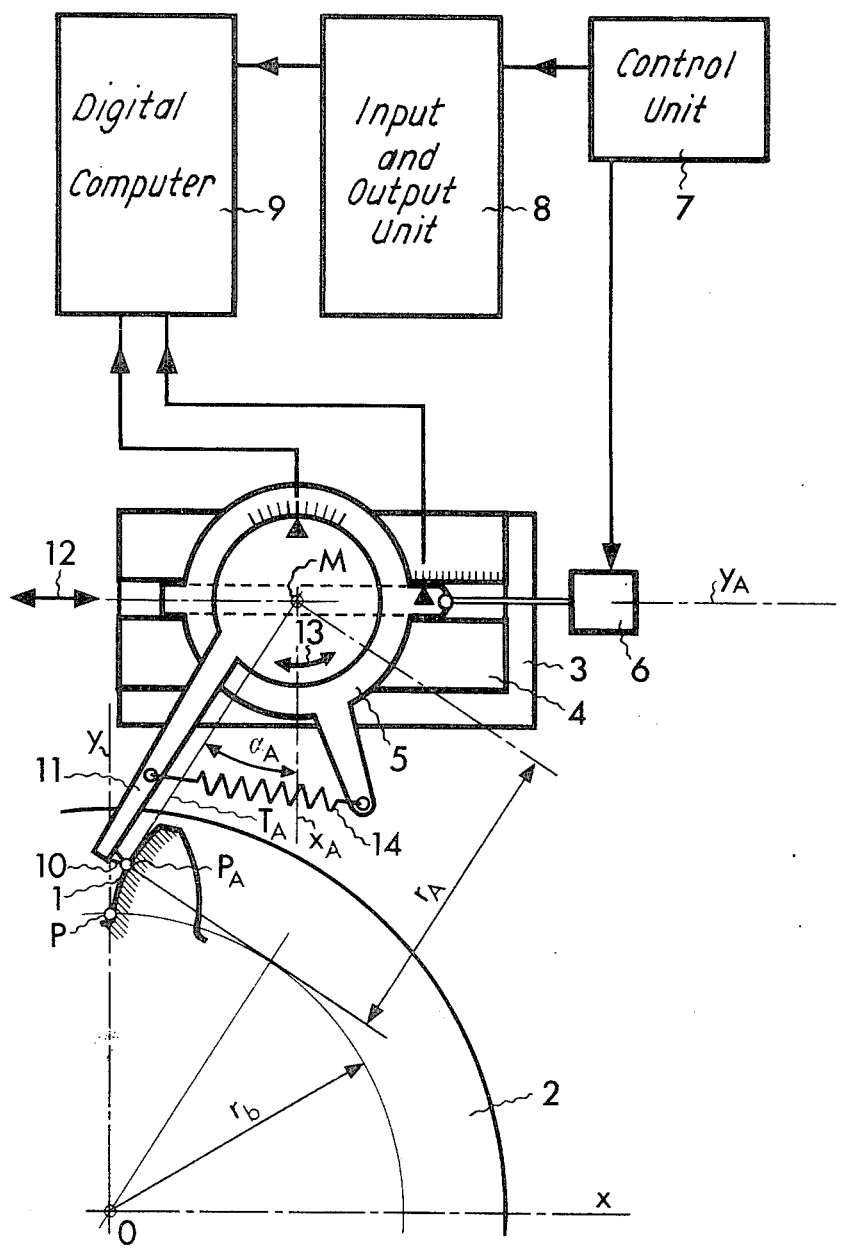
FIG. 1 illustrates an embodiment of the invention in which a probe or stylus is displaceable parallel to the X-axis of a Cartesian co-ordinate system.

Referring to the constructional form which is illustrated in FIG. 1, a gearwheel 1 the tooth profile of which is to be tested is clamped fixed on a turntable 2 of a gear production or testing machine. The machine turntable and the manner of securing the gearwheel are entirely conventional and further description or illustration is therefore not needed. A Cartesian co-ordinate system is assumed to have its axes running through the centre O of the gearwheel 1, also the centre of the turntable 2. The Y-axis of the co-ordinate system extends through a point P of the tooth profile which is to be tested.

Arranged on the machine alongside the turntable 2 so as to be adjustable in the Y-direction and X-direction is a base plate 3 of a linear detector 4, said adjustability may be obtained in known manner by the use of a carriage movable on slides parallel to one axis and itself carrying slides parallel to the other axis and on which the base plate moves, both said movements preferably being motorised. Provided as movable part of the linear detector 4 is an angle detector 5, which is displaceable in the X-direction, as indicated by the double arrow 12, by means of a motor 6 relatively to the base plate 3.

Connected to the motor 6 is a control unit 7 for the starting and stopping of the motor, for its forward and reverse running and for its speed adjustment. The control unit 7 is connected to an input and output unit 8 (terminal); this serves for the input of the set position co-ordinates $x_A$ and $y_A$ of the base plate and of the detectors 4 and 5 arranged thereon, the starting and end positions of the angle detector 5, the measurement or testing speeds, the data of the profile to be tested and the required type of measurement recording. The measurement or test data are also emitted by the unit 8. Connected to the unit 8 is a digital computer 9 for calculating the reference path of the profile 1 to be tested. The linear detector 4 and the angle detector 5 are connected to the digital computer 9.

Provided as movable part of the angle detector 5 is a lever 11, which as indicated by the double arrow 13 is rotatable about a centre point M, and comprises a probe or stylus 10 at a fixed distance $r_A$ from the centre M. The lever is connected by a biasing arrangement in the form of a tension spring 14 to the non-rotatable part of the angle detector 5.

For the gear 1 to be tested on the machine on which it is produced, the turntable 2, on which the gearwheel is still clamped, as at the time of cutting or grinding the profile, is brought into a predetermined testing position and fixed there. The two detectors 4 and 5 are brought into a specified initial position with the co-ordinates $x_A$ and $y_A$ for the centre M of the angle detector 5, the rotatable part of the angle detector assuming its middle position. In this middle position, the probe or stylus 10 contacts the gear tooth profile at a point $P_A$ substantially at the middle of the height of the tooth; the contact tangent $T_A$ subtends the angle $\alpha_A$ to the Y-axis. When the profile 1 is an involute profile, the perpendicular to the profile at the point $P_A$ is a tangent to the base circle with the radius $r_b$.

The actual testing operation is begun from the starting point P of the involute, i.e., from the original position which is shown in FIG. 1, the angle detector 5 is shifted towards the left, as seen in the drawing, until the stylus 10 contacts the involute profile at the point P; in this operation the lever 11, under the action of the spring 14, carries out a pivotal movement, namely, in a counterclockwise direction as seen in the drawing. The direction of rotation and the speed of the motor 6 are then selected on the control unit 7. Introduced into the unit 8 are the gear data, the calculating programme, the permissible tolerances and also the commencement and the end of the measuring distance.

The measuring process is initiated by the starting signal for the motor 6, which displaces the linear detector and with it the angle detector 5 towards the right, the linear detector 4 delivering signal pulses to the digital computer 9 to indicate its change of position. Because of this linear movement, the stylus 10 is drawn over the profile 1, under a light pressure that is maintained substantially constant by the spring 14, the angle detector 5 thereby carrying out a clockwise pivotal movement. The angle detector 5 similarly indicates its change of angular position by signal pulses to the digital computer, which compares the reference values with the actual values of the tooth profile as determined by the signals from both the detectors and, taking into account the tolerance limits, transmits the resulting output to the unit 8, from which the required test figures are transmitted, for example, in the form of a printed record or a punched tape.

Figure 2:
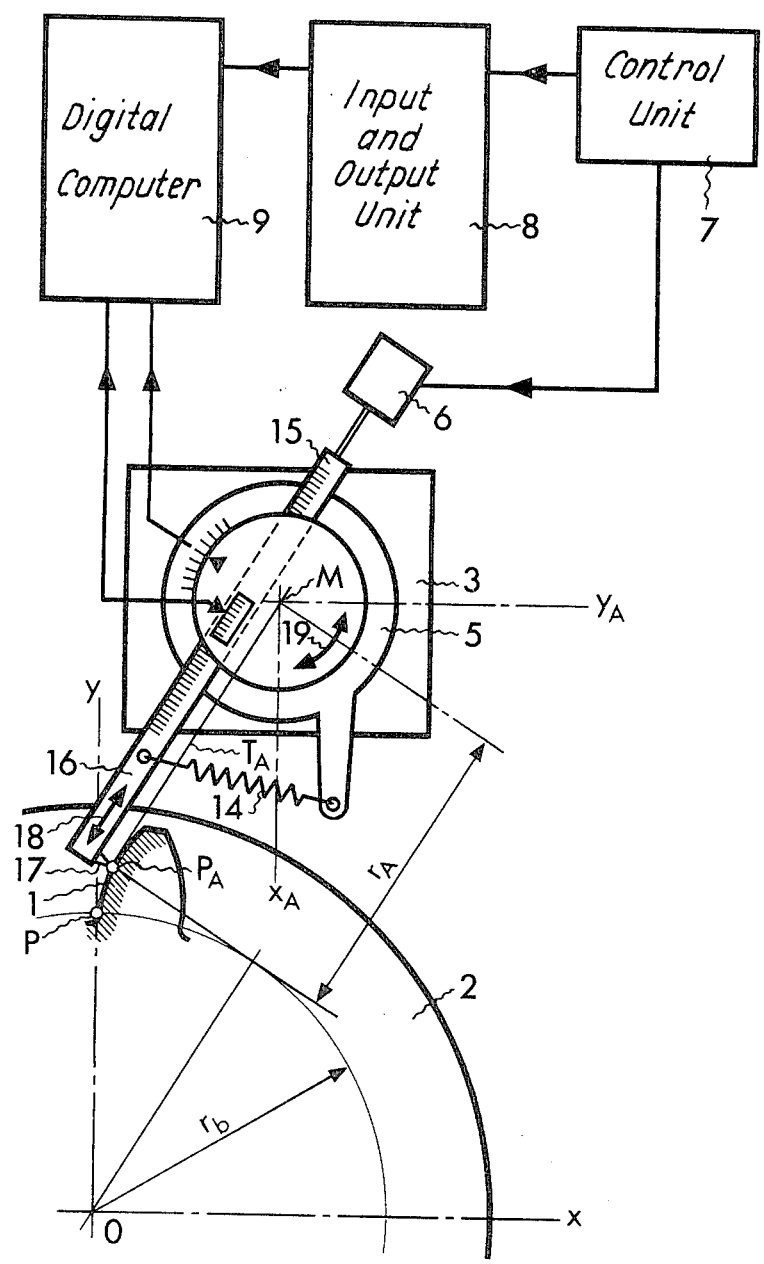
FIG. 2 illustrates a second embodiment of the invention in which a probe or stylus is arranged on a longitudinally displaceable arm.

The constructional form of the invention illustrated in FIG. 2 uses the same reference numbers to indicate parts already described with reference to FIG. 1. The centre point M of the angle detector 5 has the co-ordinates $x_A$ and $y_A$ with the same original position of the stylus 10 as in FIG. 1. The linear detector 4 of the first example however is replaced by a linear detector 15, which comprises a lever 16 carrying the stylus 10. When the linear detector 15 is shifted, by the motor 6, in one of the directions of double arrow 18, the effective length $r_A$ of the lever 16 is modified, and by the contact of the probe or stylus 10 with the profile 1, the angle detector 5 is swung clockwise or counter-clockwise, as indicated by the double arrow 19. This is also effected under the approximately constant light pressure of the biassing device 14.

On beginning the actual testing process at the point P, the lever 16 is drawn in by means of the motor 6, so that the middle point spacing $r_A$ of the stylus 10 is reduced and the stylus is drawn over the profile 1. In this movement, as seen in the drawing the angle detector 5 first of all pivots clockwise and then counter-clockwise. The corresponding pulses from the two detectors 5 and 15 are fed to the digital computer 9, which effects a comparison with the reference values in accordance with the calculating programme supplied, and the resulting deviation values are emitted from the unit 8.

Figure 3:
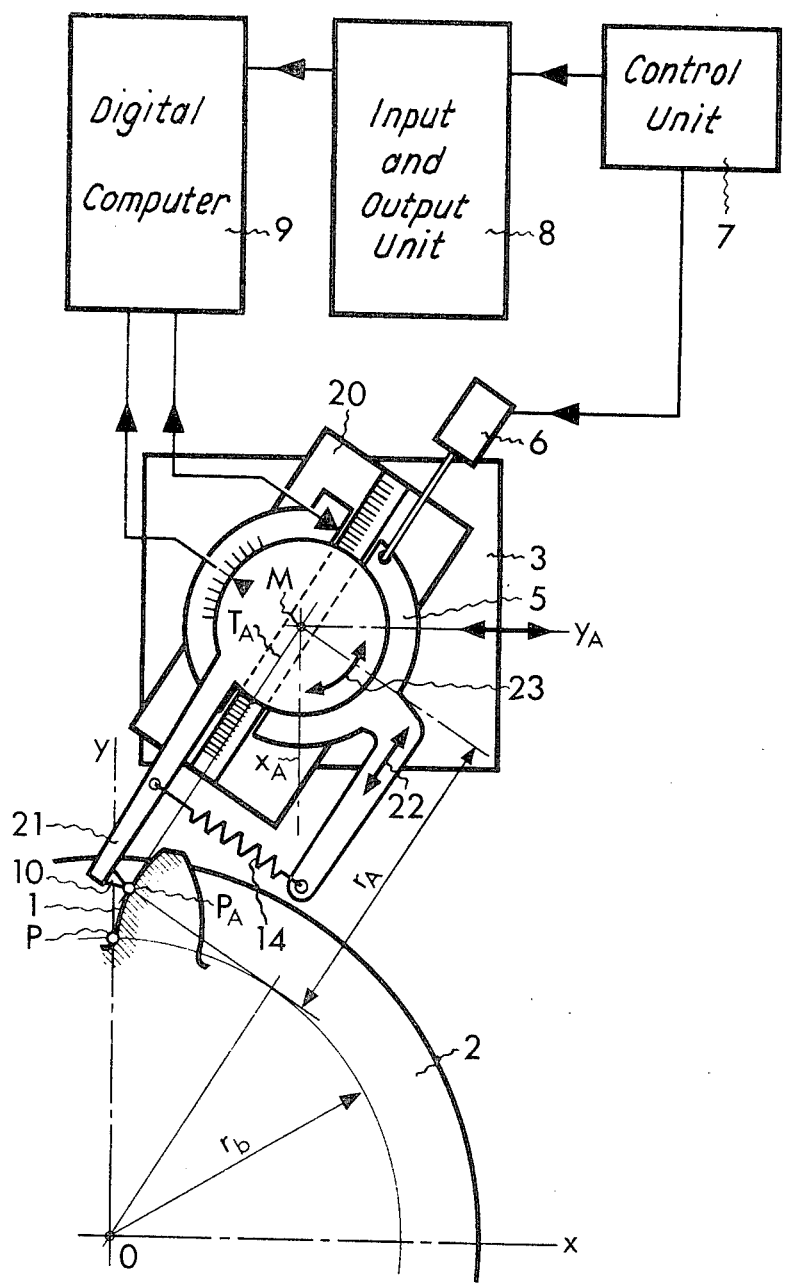
FIG. 3 illustrates another embodiment of the invention in which a probe or stylus is displaceable along a tangent to the profile to be tested.

In the constructional form of the invention illustrated in FIG. 3 parts already described are again indicated by the same reference numbers. The centre point M of the angle detector 5 has the coordinates $x_A$ and $y_A$ with the same initial position of the probe or stylus 10 as previously described. The angle detector 5 is displaceable in the direction of the tangent $T_A$ on a linear detector 20, the effective length $r_A$ of the lever 11 being constant. With displacement of the linear detector 20 in one of the directions of the double arrow 22 by the motor 6, the stylus or probe 10 being maintained in contact with the gear tooth profile by the biassing device 14, the angle detector 5 is swivelled in a clockwise or counerclockwise direction corresponding to the double arrow 23.

On beginning the testing operation at the point P, the stylus 10 is drawn upwardly and towards the right, as seen in the drawing, over the gear tooth profile during the displacement of the angle detector 5 along the linear detector 20. As a consequence, the angle detector 5 is first of all pivoted clockwise and then counter-clockwise. The signal pulses from the two detectors 5 and 20 are fed to the digital computer 9 to indicate the changes of stylus position and these signals are evaluated in the manner already described, in connection with FIGS. 1 and 2.

Figure 4:
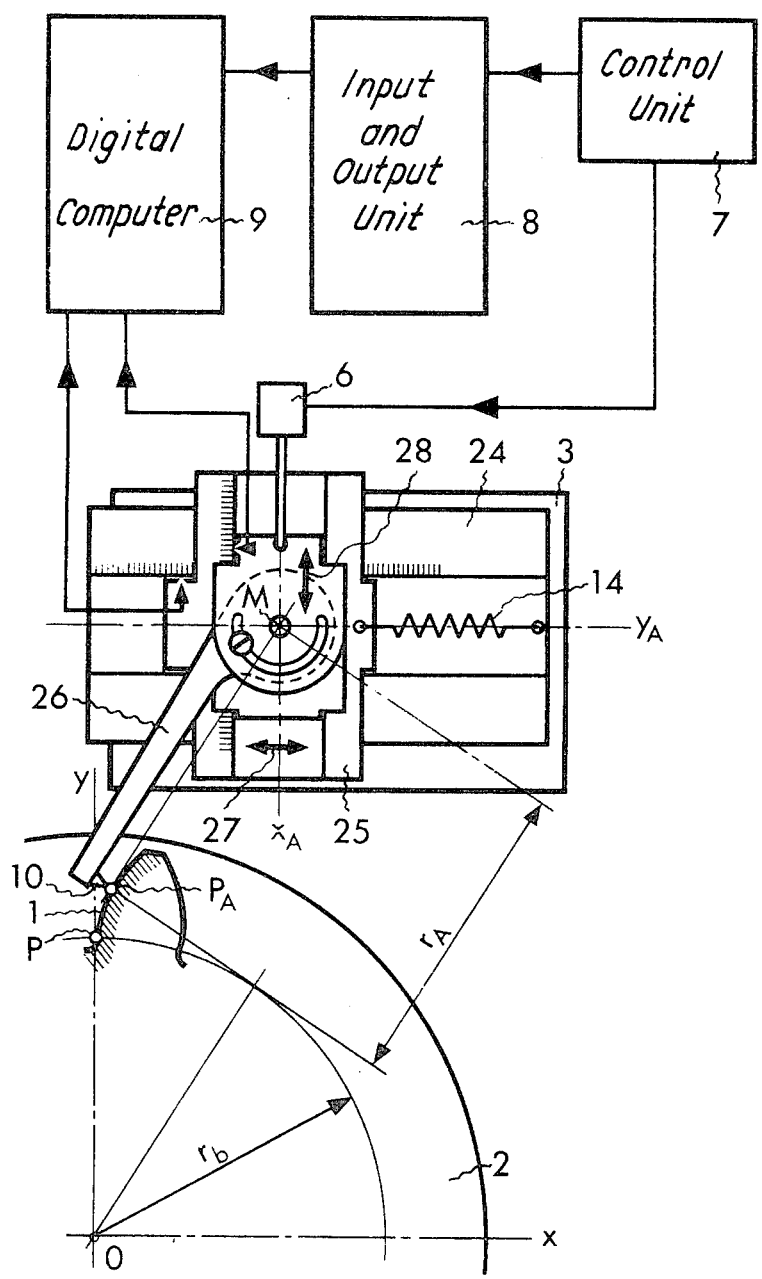
FIG. 4 illustrates a further embodiment of the invention in which the motion of a probe or stylus is detected as two mutually transverse linear components.
Figure 5:
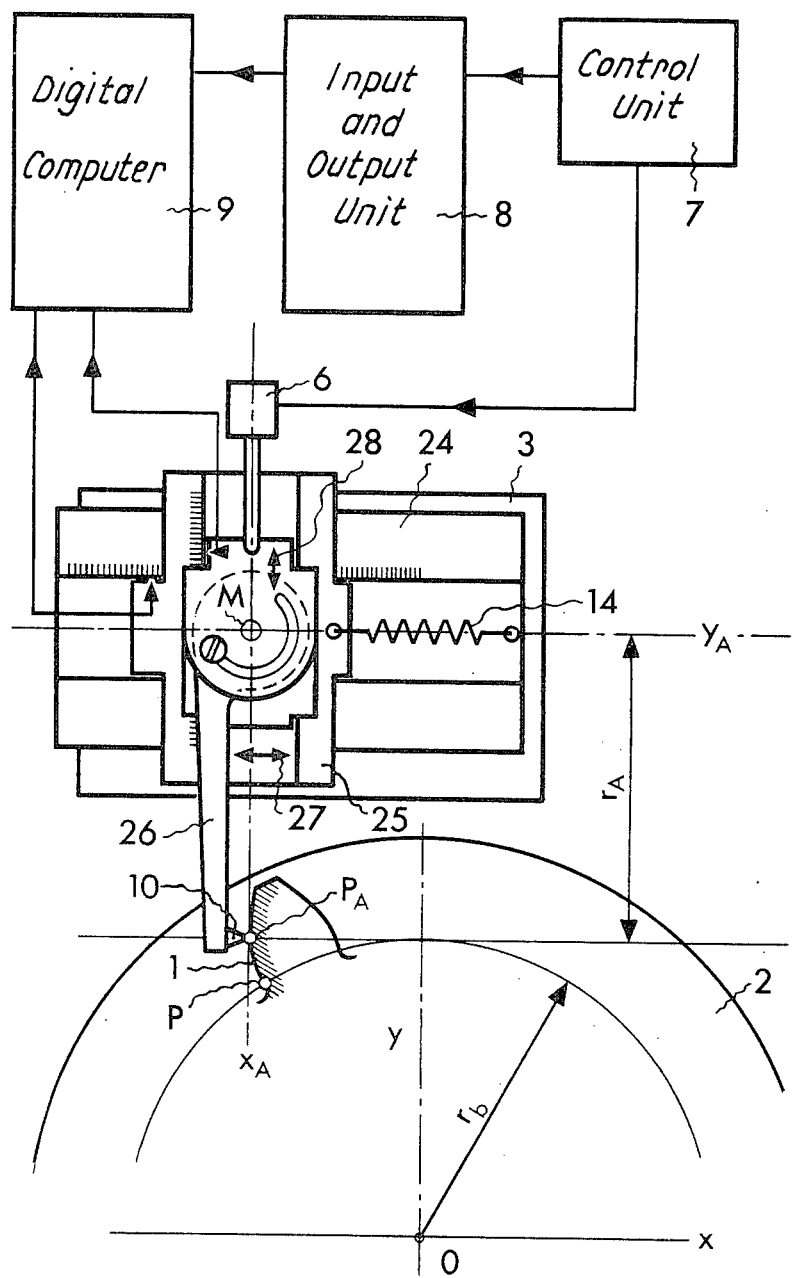
FIG. 5 illustrates the apparatus of FIG. 4 in a different starting position.

Another possible arrangement which can be employed for testing any arbitrary gearing profile is illustrated in FIGS. 4 and 5. The same reference numbers are again given to parts already described. Arranged on the base plate 3 is a linear detector 24, on the movable part of which is provided another linear detector 25. Seated on an angularly adjustable lever 26 of the linear detector 25 is the stylus 10, which bears against the profile 1 under the gentle pressure of the biasing arrangement 14. The movable part of the linear detector 24 is displaceable together with the linear detector 25 in the directions of the double arrow 27, and by means of the motor 6 the movable part of the linear detector 25 is displaceable transversely, conveniently perpendicularly thereto in the directions of the double arrow 28. The centre point M represents the instantaneous means of the two linear detectors 24 and 25 and, as with the other constructional forms described, is outside the gear centre O.

Beginning the testing procedure at the point P, as before, the motor 6 shifts the movable part of the linear detector 25 in an upward direction as seen in the drawing, so that the stylus 10 is drawn over the profile 1. Under the light tension of the spring 14, which also in this case holds the probe or stylus 10 against the profile 1, the displaceable part of the linear detector 24 is moved towards the right. In this case, the changes in position of the linear detector 24 are compared in the digital computer 9 with the reference values and the differences are given in the output from the unit 8.

The detectors of the examples described above advantageously comprise devices having capacitative sensing such as are disclosed in Swiss Patent No. 550,378 and U.S. application Ser. No. 395,132, but can also comprise devices having known forms of optical and/or electronic sensing.

What I claim and desire to secure by letters patent is:

1. Gear tooth profile testing apparatus comprising a probe for engagement with a gear tooth flank, a first displaceable mounting on which the probe is securable and a second displaceable mounting on which said first mounting is supported, and a base on which said second mounting is supported, the first and second mountings having different directions of displacement, biassing means connected to at least one of said mountings for holding the probe against said tooth flank and driving means for displacement of one of said mountings and thereby for movement of the probe along said flank, respective measuring devices sensing the displacement of the two mountings for measuring respective components of the relative movement between the probe and the tooth flank, and means for transmitting respective series of measurement signals from said devices, one of said series of signals representing the relative movement between the two mountings with the tooth flank stationary and the other of said series of signals representing the movement of one of the mountings relative to a fixed point, comparison means receiving said measurement signals and means for supplying reference signal values to said comparison means, said comparison means determining the difference between the reference signal values and the actual signal values from the measuring devices.

2. Apparatus according to claim 1 wherein one of the mountings is rotatably displaceable and its measurement device is an angle-measuring arrangement.

3. Apparatus according to claim 1 further comprising a rotary mounting for a gear to be tested, said rotary mounting having a central axis spaced from and parallel to the axis of rotational displacement of said one mounting.

4. Apparatus according to claim 3 having means for restraining the movement of the other of said two mountings of the probe to linear displacements and for locating said displacements along a line parallel to a tangent to the base circle of the gear under test, which tangent extends through the root point of the flank engaged by the probe.

5. Apparatus according to claim 3 wherein the axis of rotational displacement of said one mounting of the probe is arranged for location on a tangent to the tooth flank profile to be tested.

6. Apparatus according to claim 5 wherein said rotatably displaceable mounting of the probe is supported on the other of said mountings of the probe, means being provided on the base for restricting the movement of said other mounting to linear displacements and for directing said displacements along the tangent to said flank profile.

7. Apparatus according to claim 1 wherein respective means restrain the movements of the two mountings of the probe to respective linear displacements, means securing the probe to the first mounting in a pivotally adjustable manner.

* * * * *